(12) United States Patent
Chaouki Almagro et al.

(10) Patent No.: US 10,284,138 B2
(45) Date of Patent: May 7, 2019

(54) SOLAR TRACKER HAVING A BIDIRECTIONAL LIMIT SWITCH DEVICE (71) Applicant: SOLTEC AMERICA, LLC (72) Inventors: Samir Chaouki Almagro, Madrid (ES); Javier Castejon Munoz, Murcia (ES); Francisco Jesus Fernandez Luque, Murcia (ES)

(*) Notice: Subject to any disclaimer, the term of this patent is extended or adjusted under 35 U.S.C. 154(b) by 267 days.

(21) Appl. No.: 15/488,605

(22) Filed: Apr. 17, 2017

(65) Prior Publication Data

US 2018/0302024 A1    Oct. 18, 2018

(51) Int. Cl.
*H02S 20/32* (2014.01)
*H02P 7/03* (2016.01)
(Continued)

(52) U.S. Cl.
CPC ............ *H02S 20/32* (2014.12); *F24S 30/425* (2018.05); *F24S 50/20* (2018.05); *H02P 7/04* (2016.02); *Y02E 10/47* (2013.01)

(58) Field of Classification Search
CPC .................................. H02S 20/32; H02P 7/04
See application file for complete search history.

(56) References Cited

U.S. PATENT DOCUMENTS 4,215,410 A * 7/1980 Weslow ................. G05D 3/105
                                                                700/61
4,794,909 A * 1/1989 Eiden ...................... F24J 2/542
                                                                126/575
(Continued)

*Primary Examiner* — Fritz M Fleming (74) *Attorney, Agent, or Firm* — Eugenio J. Torres-Oyola; Victor M. Rodriguez-Reyes; Rafael Rodriguez-Muriel (57) ABSTRACT

The solar tracker having a bidirectional limit switch device comprises at least one solar panel (10) supported on a pivoting structure (12) tiltable in opposite first and second directions about a rotation axis (13) by a DC electric motor (M) a controller (14) and an actuator (15) controlling actuation of the electric motor (M), an inclinometer (16) fixed to the pivoting structure (12) and connected to the controller (14) to detect an actual physical positive or negative tilt angle of the solar panel (10) with respect to a horizontal plane, and a feed circuit (17) to apply a voltage having a selected polarity to the actuator (15) to produce rotation of the electric motor (M) either in the first direction or in the second direction. The actuator (15) comprises MOSFET-type first and second actuator transistors (Q1, Q2), each having a drain terminal (D), a source terminal (S) and a gate terminal (G), the first and second actuator transistors (Q1, Q2) having the drain terminals (D) respectively connected to first and second terminals (A, B) of the electric motor (M), the source terminals (S) respectively connected to first and second output terminals (1, 2) of the feed circuit (17), and the gate terminals (G) connected via the controller (14) to the inclinometer (16), and first and second diodes (D1, D2) connected in parallel between the drain terminals (D) and the source terminals (S) of the first and second actuator transistors (Q1, Q2) providing a bypass current path from the source terminals (S) of the first and second actuator transistors (Q1, Q2) to the first and second terminals (A, B) of the electric motor (M), and wherein either the first or the second actuator transistor (Q1, Q2) is put in an off state causing stop of the electric motor (M) upon receiving a positive or negative limit signal delivered by the inclinometer (16) when tilting of the pivoting structure (12) reaches a positive or negative limit tilt angle (PLTA, NLTA), the bypass current path provided by the corresponding first or second diode (D1, D2) allowing the electric motor (M) to turn in an opposite direction when an inverted voltage is applied.

7 Claims, 5 Drawing Sheets

(51) Int. Cl.
*F24S 50/20* (2018.01)
*F24S 30/425* (2018.01)

(56) References Cited

U.S. PATENT DOCUMENTS

| | | | | |
|---|---|---|---|---|
| 4,890,599 A * | 1/1990 | Eiden | ............ | G05D 3/105 |
| | | | | 126/606 |
| 8,178,775 B2 * | 5/2012 | Taylor, II | ............ | H02S 20/32 |
| | | | | 136/246 |

* cited by examiner

SOLAR TRACKER HAVING A BIDIRECTIONAL LIMIT SWITCH DEVICE

TECHNICAL FIELD

The present invention relates to a solar tracker having a bidirectional limit switch device wherein the solar tracker comprises one or more solar panels supported on a pivoting structure rotated in both directions about a rotation axis by an electric motor to follow the relative path of the sun and the bidirectional limit switch device is able to stop the operation of the electric motor when tilting of the pivoting structure reaches a positive or negative limit tilt angle and to allow the electric motor to turn in an opposite direction when an inverted voltage is applied after being stopped.

BACKGROUND ART

Document IN 201501675 I4 discloses a solar tracking system comprising a solar panel array arranged in landscape configuration, a controller, an actuator, an inclinometer, and an encoder. The Inclinometer and the encoder form a closed loop system. The controller uses a program to suit the desired position by inputting feedback signal from both the inclinometer and the encoder. Actual tilt angle signal from inclinometer is adjusted selectively equal to the desired tilt angle of the panel array.

DISCLOSURE OF THE INVENTION

The present invention provides a solar tracker having a bidirectional limit switch device comprising one or more solar panel supported on a pivoting structure tiltable about a rotation axis, a DC electric motor operatively connected to produce rotation of the pivoting structure in opposite first and second directions, a controller and an actuator controlling actuation of the electric motor, an inclinometer fixed to the pivoting structure and connected to the controller to detect an actual physical positive or negative tilt angle of the solar panel with respect to a horizontal plane, and a feed circuit to apply a voltage having a selected polarity to the actuator to produce rotation of the electric motor either in the first direction or in the second direction.

According to a preferred embodiment of this invention, the actuator comprises MOSFET-type first and second actuator transistors and first and second diodes. Each of the first and second actuator transistors has a drain terminal, a source terminal and a gate terminal. The first and second actuator transistors have the respective drain terminals respectively connected to first and second terminals of the electric motor, the respective source terminals respectively connected to first and second output terminals of the feed circuit, and the respective gate terminals connected via the controller to the inclinometer. The first and second diodes are respectively connected in parallel between the drain terminals and the source terminals of the first and second actuator transistors, thereby providing a bypass current path from the source terminals of the first and second actuator transistors to the first and second terminals of the electric motor.

Either the first or the second actuator transistor is put in an off state causing stop of the electric motor upon receiving a positive or negative limit signal delivered by the inclinometer when tilting of the pivoting structure reaches a positive or negative limit tilt angle. The bypass current path provided by the corresponding first or second diode allows the electric motor to turn in an opposite direction when an inverted voltage is applied.

In the absence of the positive or negative limit signal from the inclinometer, the first and second actuator transistors are kept at an on state.

With this configuration, the actuator acts as a bidirectional limit switch device to detect positive and negative angles with respect to the horizontal, which stops the operation of the electric motor when tilting of the pivoting structure reaches a predetermined positive or negative limit tilt angle and allows the electric motor, after being stopped, to turn in an opposite direction when an inverted voltage is applied thereto by the feed circuit.

In one embodiment, the feed circuit comprises an H-bridge circuit including first and second branches and MOSFET-type first, second, third and fourth feed circuit transistors. In the H-bridge circuit, the first and second feed circuit transistors are connected in series in the first branch, the third and fourth feed circuit transistors are connected in series in the second branch, the first output terminal of the feed circuit is connected at a point of the first branch located between the first and second feed circuit transistors, and the second output terminal of the feed circuit is connected at a point of the second branch located between the third and fourth feed circuit transistors.

Each of the first, second, third and fourth feed circuit transistors of the feed circuit has a drain terminal, a source terminal and a gate terminal. The drain terminals of the first and third feed circuit transistors of the first and second branches are connected to a first input terminal of the feed circuit, and the source terminals of the second and fourth feed circuit transistors of the first and second branches are connected to a second input terminal of the feed circuit.

Preferably, the inclinometer consists of an analogic accelerometer connected to a comparator circuit that compares a voltage delivered by the analogic accelerometer with given levels of voltage corresponding to the positive and negative limit tilt angles and issues the positive or negative limit signal to a corresponding one of the first and second actuator transistors. First and second trimers included in the comparator circuit allow adjusting the given levels of voltage to determine the values of the positive and negative limit tilt angles.

In one embodiment, the controller, the actuator, the feed circuit and the inclinometer are included in a circuit board attached to the pivoting structure in such a position that the inclinometer is parallel to a radiation receiving surface of the solar panel.

BRIEF DESCRIPTION OF THE DRAWINGS

The foregoing and other features and advantages will be more fully understood from the following detailed description of an illustrative and not limiting embodiment with reference to the accompanying drawings, in which.

DETAILED DESCRIPTION OF AN EMBODIMENT

Figure 1:
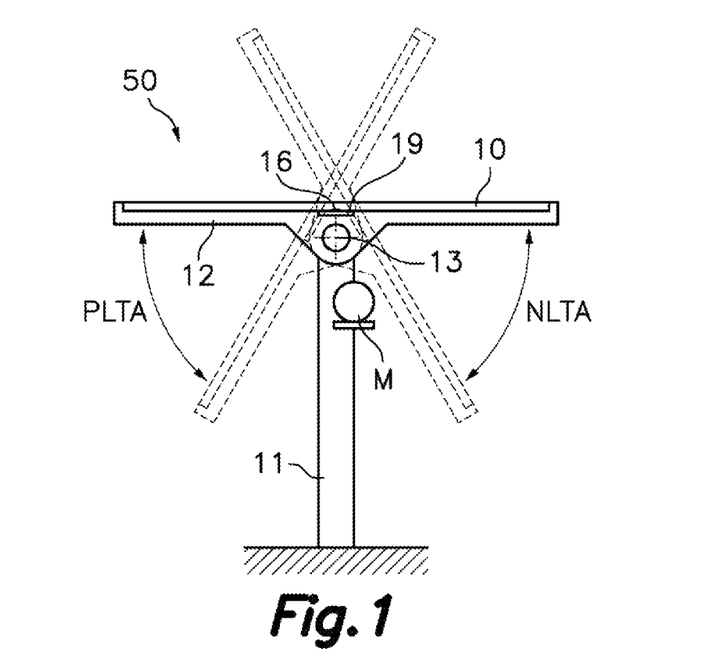
FIG. 1 is a diagrammatic side elevation view of a solar tracker having a bidirectional limit switch device according to an embodiment of the present invention.

Referring first to FIG. 1, reference sign 50 designates in general a solar tracker having a bidirectional limit switch device according to an embodiment of the present invention, which comprises one or more solar panels 10 supported on a pivoting structure 12 tiltable about a rotation axis 13 with respect to a base structure 11 anchored to the ground. A DC electric motor M supported on the base structure 11 is operatively connected to produce rotation of the pivoting structure 12 and the solar panel 10 in opposite clock and counterclock directions.

In FIG. 1, the pivoting structure 12 and the solar panel 10 are shown in a horizontal position by means of continuous lines and in two opposite tilted positions by means of phantom lines. In one of the tilted positions tilting of the pivoting structure 12 has reached a positive limit tilt angle PLTA an in the other of the tilted positions tilting of the pivoting structure 12 has reached a negative limit tilt angle NLTA.

Attached to the pivoting structure 12 is a circuit board 19 including an inclinometer 16 arranged parallel to a radiation receiving surface of the solar panel 10.

Figure 2:
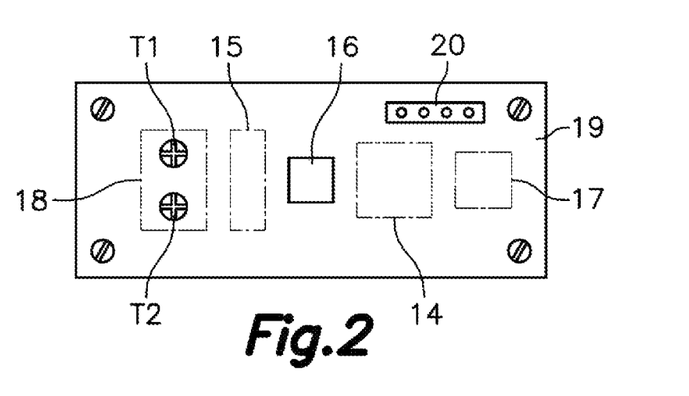
FIG. 2 is a plan view of a circuit board including feed elements, control elements and elements of the bidirectional limit switch device of the solar tracker.

As shown in FIG. 2, the circuit board 19 includes besides the inclinometer 16, a controller 14, an actuator 15, a feed circuit 17, and an output connector 20. The controller 14 and the actuator 15 are arranged to control actuation of the electric motor M. The inclinometer 16 is connected to the controller 14 to detect an actual physical positive or negative tilt angle of the solar panel 10 with respect to a horizontal plane. The feed circuit 17 is connected to a DC electric supply source and arranged to apply a voltage having a selected polarity to the actuator 15 to produce rotation of the electric motor M either in the clock direction or in the counterclock direction.

The inclinometer 16 consists of an analogic accelerometer which delivers a voltage proportional to a positive or negative tilt angle with respect to the horizontal. The inclinometer 16 is connected to a comparator circuit 18 that compares the voltage delivered by the analogic accelerometer with given levels of voltage corresponding to the positive and negative limit tilt angles PLTA, NLTA and issues a positive or negative limit signal. The comparator circuit 18 includes first and second trimers T1, T2 by which the given levels of voltage are adjustable to determine the values of the positive and negative limit tilt angles PLTA, NLTA.

Figure 3:
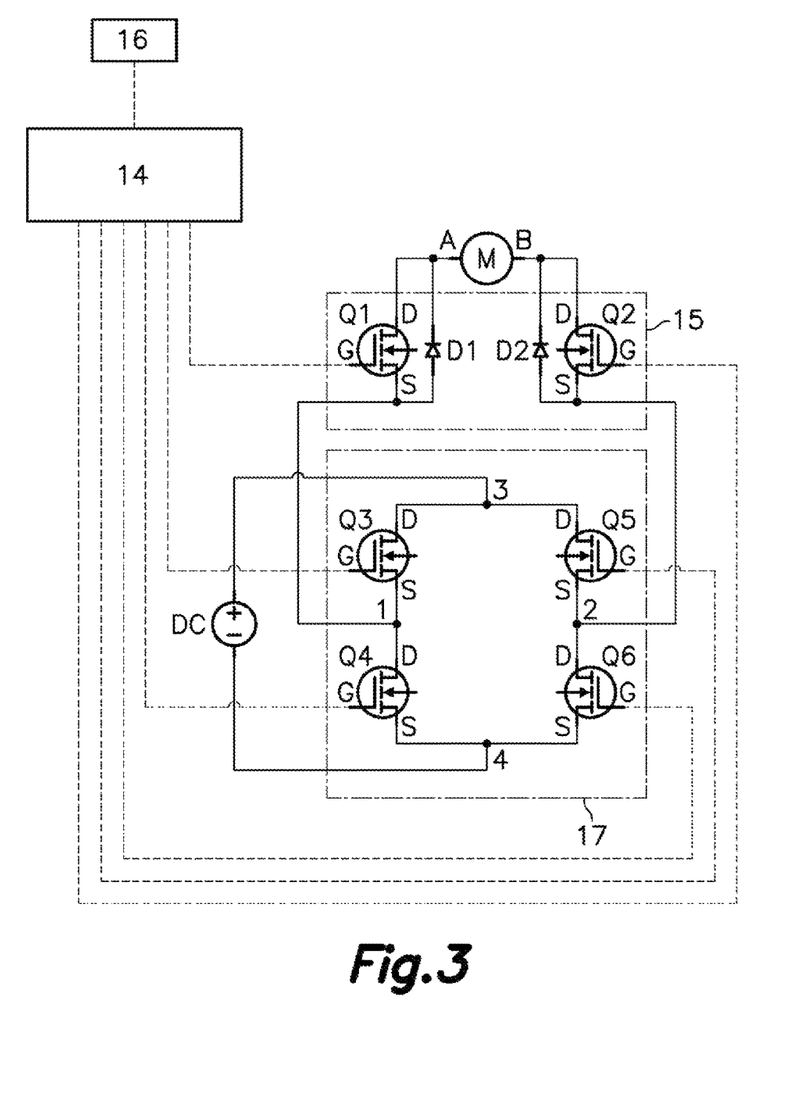
FIG. 3 is a diagram of an electric circuit including feed elements, control elements and elements of the bidirectional limit switch device of the solar tracker.

Referring now to FIG. 3, the actuator 15, which performs the functions of the limit switch device, comprises MOSFET-type first and second actuator transistors Q1, Q2 and first and second diodes D1, D2. Each of the first and second actuator transistors Q1, Q2 has a drain terminal D, a source terminal S and a gate terminal G.

The drain terminals D of the first and second actuator transistors Q1, Q2 are respectively connected to first and second terminals A, B of the electric motor M, the source terminals S of the first and second actuator transistors Q1, Q2 are respectively connected to first and second output terminals 1, 2 of the feed circuit 17, and the gate terminals G of the first and second actuator transistors Q1, Q2 are connected via the controller 14 to the inclinometer 16.

The first and second diodes D1, D2 are connected in parallel between the drain terminals D and the source terminals S of the first and second actuator transistors Q1, Q2 whereby providing a bypass current path from the source terminals S of the first and second actuator transistors Q1, Q2 to the first and second terminals A, B of the electric motor M.

In the proposed embodiment, the feed circuit 17 comprises an H-bridge circuit including first and second branches and four MOSFET-type transistor, namely first, second, third and fourth feed circuit transistors Q3, Q4, Q5, Q6, each of which has a drain terminal D, a source terminal S and a gate terminal G.

In the feed circuit 17, the first and second feed circuit transistors Q3, Q4 are connected in series in the first branch and the third and fourth feed circuit transistors Q5, Q6 are connected in series in the second branch. To this end, the source terminal S of the first feed circuit transistor Q3 is connected to the drain terminal D of the second feed circuit transistor Q4, and the source terminal S of the third feed circuit transistor Q5 is connected to the drain terminal D of the fourth feed circuit transistor Q6.

The first output terminal 1 of the feed circuit 17 is connected at a point of the first branch between the first and second feed circuit transistors Q3, Q4, and the second output terminal 2 of the feed circuit 17 is connected at a point of the second branch between the third and fourth feed circuit transistors Q5, Q6.

The drain terminals D of the first and third feed circuit transistors Q3, Q5 of the first and second branches are connected to a first input terminal 3 of the feed circuit 17 and the first input terminal 3 is connected to a positive output terminal of the DC electric supply source. The source terminals S of the second and fourth feed circuit transistors Q3, Q6 of the first and second branches are connected to a second input terminal 4 of the feed circuit 17, and the second input terminal 4 is connected to a negative output terminal of the DC electric supply source.

Operation of the limit switch device of the solar tracker 50 is described with relation to FIGS. 4-9.

Figure 4:
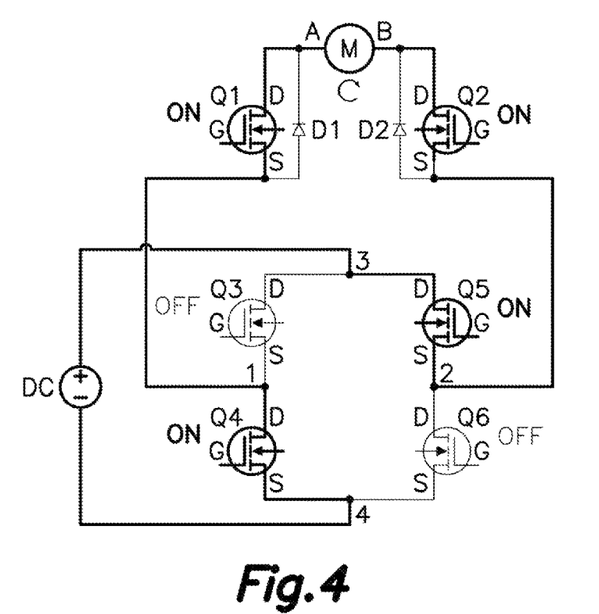
FIG. 4 is a diagram showing part of the electric circuit of FIG. 3 arranged in a first operative situation causing an electric motor actuating the solar tracker to turn in a clock direction.

In a first operative situation shown in FIG. 4, the electric circuit is arranged to cause the electric motor M to turn in a clock direction. To this end, the controller 14 puts the first and fourth feed circuit transistors Q3, Q6 in an off state OFF and the second and third feed circuit transistors Q4, Q5 in an on state ON while in the absence of a negative limit signal from the inclinometer 16 the first and second actuator transistors Q1, Q2 are kept in an on state ON. This way, positive DC voltage is fed from the positive terminal of DC electric supply source to the second terminal B of the electric motor M and negative DC voltage is fed from the negative terminal of the DC electric supply source to the first terminal A of the electric motor M to make the electric motor to turn clockwise and the pivoting structure 12 and the solar panel 10 to tilt increasing a negative tilt angle.

Figure 5:
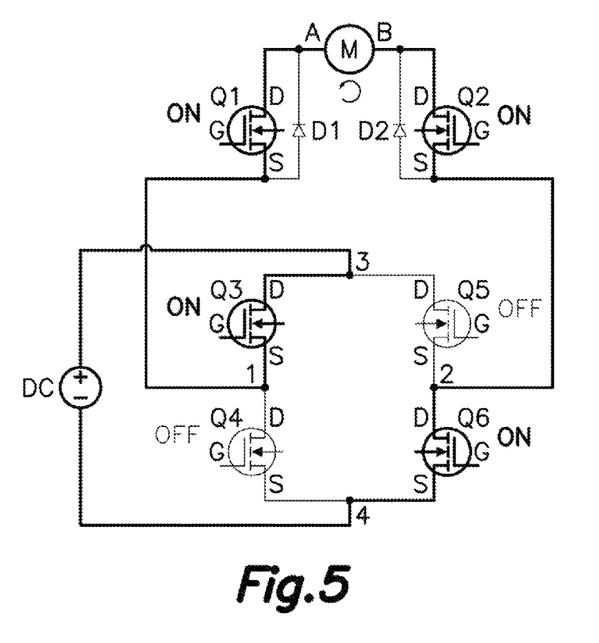
FIG. 5 is a diagram showing the electric circuit of FIG. 4 arranged in a second operative situation causing the electric motor to turn in a counterclock direction.

In a second operative situation shown in FIG. 5, the electric circuit is arranged to cause the electric motor M to turn in a counterclock direction. To this end, the controller 14 puts the second and third feed circuit transistors Q4, Q5 in an off state OFF and the first and fourth feed circuit transistors Q3, Q6 in an on state ON while in the absence of a positive limit signal from the inclinometer 16 the first and second actuator transistors Q1, Q2 are kept in an on state ON. This way, positive DC voltage is fed from the positive terminal of the DC electric supply source to the first terminal A of the electric motor M and negative DC voltage is fed from the negative terminal of the DC electric supply source to the second terminal B of the electric motor M to make the electric motor to turn counterclockwise and the pivoting structure 12 and the solar panel 10 to tilt increasing a positive tilt angle.

Figure 6:
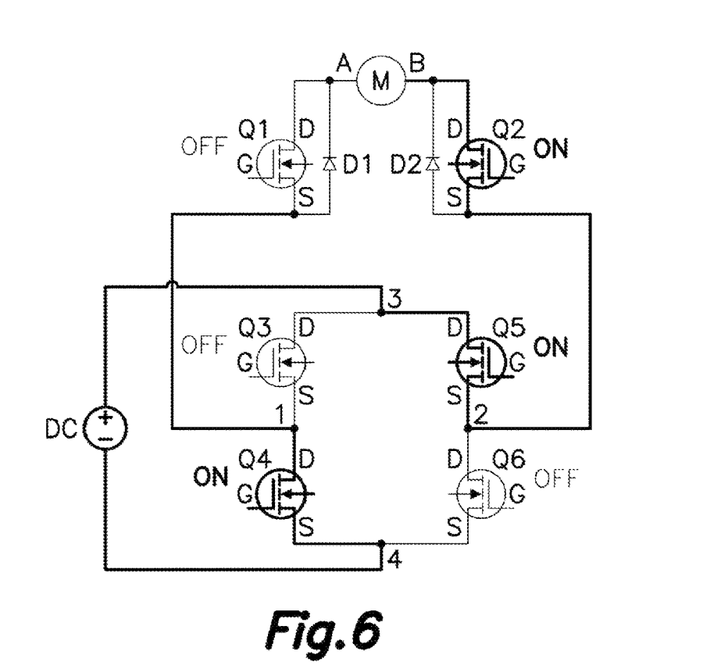
FIG. 6 is a diagram showing the electric circuit arranged in a third operative situation causing the electric motor, which was initially turning in the clock direction, to stop when tilting of the pivoting structure reaches a positive limit tilt angle.

According to a third situation shown in FIG. 6, when as a result of the electric circuit being operated in the first situation (FIG. 4) tilting of the pivoting structure 12 reaches the negative limit tilt angle NLTA, a negative limit signal is delivered by the inclinometer 16 to the first actuator transistor Q1 via controller 14, so that the first actuator transistor Q1 is put in an off state OFF cutting a current path therethrough and causing the electric motor M to stop. This constitutes a limit switch operation that avoids further tilting of the pivoting structure 12 to overcome the negative limit tilt angle NLTA.

Figure 7:
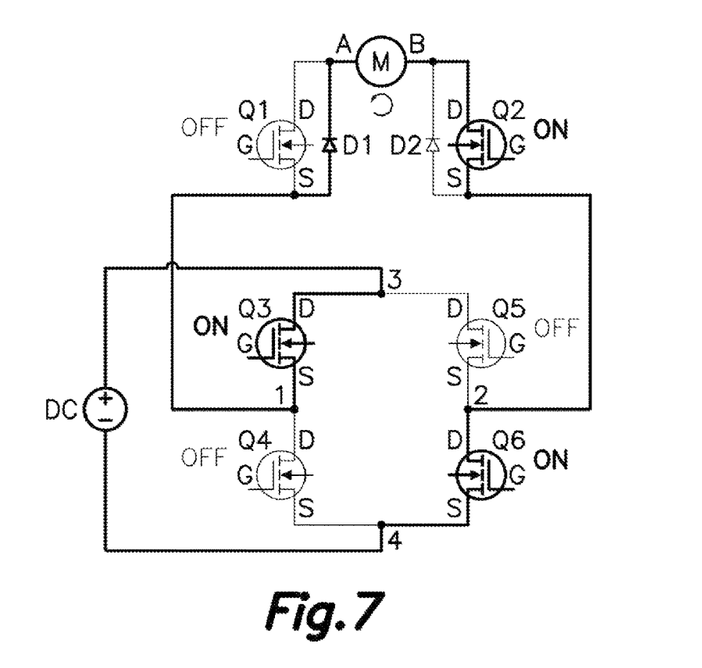
FIG. 7 is a diagram showing the electric circuit arranged in a fourth operative situation causing the electric motor to turn in the counterclock direction after being stopped.

As shown in FIG. 7, once the electric motor M is stopped after the pivoting structure 12 has reached the negative limit tilt angle NLTA, signals sent by the controller 14 turn the feed circuit 17 into a fourth situation in which the second and third feed circuit transistors Q4, Q5 are put in an off state OFF and the first and fourth feed circuit transistors Q3, Q6 are put in an on state ON, as in the second situation (FIG. 5), while the first actuator transistor Q1 is kept in the off state OFF. In this fourth situation, an inverted voltage is applied and the bypass current path provided by the first diode D1 allows positive DC voltage fed from the positive terminal of DC electric supply source to reach the second terminal B of the electric motor M, and this makes the electric motor M to turn counterclockwise.

Figure 8:
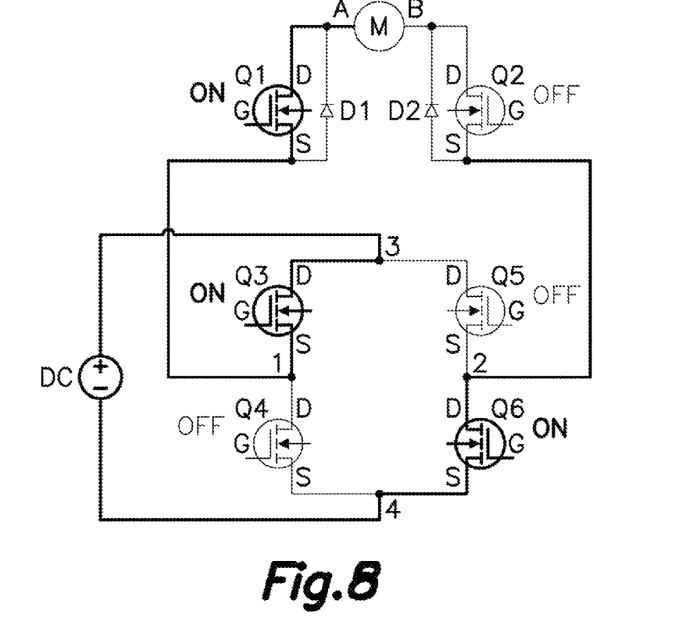
FIG. 8 is a diagram showing the electric circuit arranged in a fifth operative situation causing the electric motor, which was initially turning in the counterclock direction, to stop when tilting of the pivoting structure reaches a negative limit tilt angle.

According to a fifth situation shown in FIG. 8, when as a result of the electric circuit being operated in the second situation (FIG. 5) tilting of the pivoting structure 12 reaches the positive limit tilt angle PLTA, a positive limit signal is delivered by the inclinometer 16 to the second actuator transistor Q2 via controller 14, so that the second actuator transistor Q2 is put in an off state OFF cutting a current path therethrough and causing the electric motor M to stop. This constitutes a limit switch operation that avoids tilting of the pivoting structure 12 to overcome the positive limit tilt angle PLTA.

Figure 9:
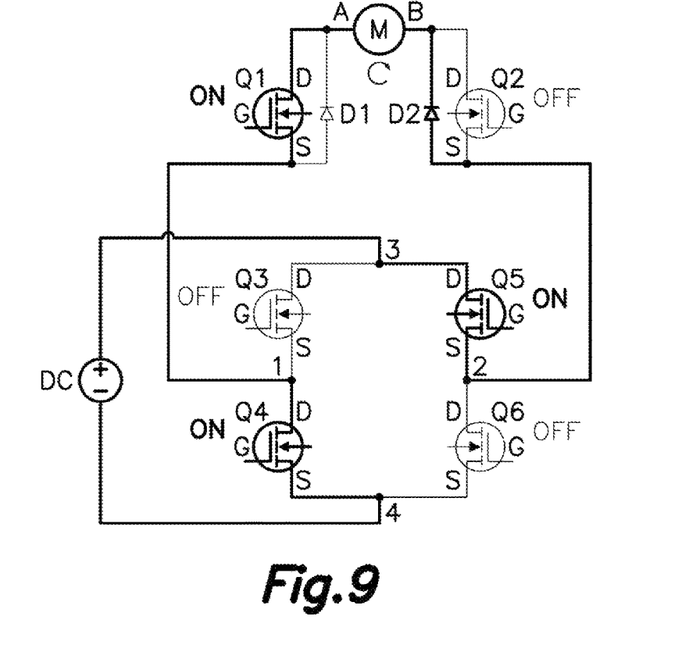
FIG. 9 is a diagram showing the electric circuit arranged in a sixth operative situation causing the electric motor to turn in the clock direction after being stopped.

As shown in FIG. 9, once the electric motor M is stopped after the pivoting structure 12 has reached the positive limit tilt angle PLTA, signals sent by the controller 14 turn the feed circuit 17 into a fourth situation in which the first and fourth feed circuit transistors Q3, Q6 are put in an off state OFF and the second and third feed circuit transistors Q4, Q5 are put in an on state ON, as in the first situation (FIG. 4), while the second actuator transistor Q2 is kept in the off state OFF. In this sixth situation an inverted voltage is applied, and the bypass current path provided by the first diode D1 allows positive DC voltage fed from the positive terminal of DC electric supply source to reach the second terminal B of the electric motor M, and this makes the electric motor M to turn counterclockwise.

What is claimed is:

1. A solar tracker having a bidirectional limit switch device, comprising:
   at least one solar panel (10) supported on a pivoting structure (12) tiltable about a rotation axis (13);
   a DC electric motor (M) operatively connected to produce rotation of said pivoting structure (12) in opposite first and second directions;
   a controller (14) and an actuator (15) controlling actuation of said electric motor (M);
   an inclinometer (16) fixed to said pivoting structure (12) and connected to said controller (14) to detect an actual physical positive or negative tilt angle of the solar panel (10) with respect to a horizontal plane;
   a feed circuit (17) to apply a voltage having a selected polarity to the actuator (15) to produce rotation of the electric motor (M) either in said first direction or in said second direction;
   wherein said actuator (15) comprises:
   MOSFET-type first and second actuator transistors (Q1, Q2), each having a drain terminal (D), a source terminal (S) and a gate terminal (G), said first and second actuator transistors (Q1, Q2) having said drain terminals (D) respectively connected to first and second terminals (A, B) of the electric motor (M), said source terminals (S) respectively connected to first and second output terminals (1, 2) of the feed circuit (17), and said gate terminals (G) connected via the controller (14) to said inclinometer (16); and
   first and second diodes (D1, D2) connected in parallel between the drain terminals (D) and the source terminals (S) of the first and second actuator transistors (Q1, Q2) providing a bypass current path from the source terminals (S) of the first and second actuator transistors (Q1, Q2) to said first and second terminals (A, B) of the electric motor (M),
   and wherein either the first or the second actuator transistor (Q1, Q2) is put in an off state causing stop of the electric motor (M) upon receiving a positive or negative limit signal delivered by the inclinometer (16) when tilting of the pivoting structure (12) reaches a positive or negative limit tilt angle (PLTA, NLTA), the bypass current path provided by the corresponding first or second diode (D1, D2) allowing the electric motor (M) to turn in an opposite direction when an inverted voltage is applied.

2. The solar tracker according to claim 1, wherein said feed circuit (17) comprises an H-bridge circuit including first and second branches and MOSFET-type first, second, third and fourth feed circuit transistors (Q3, Q4, Q5, Q6), wherein:
   said first and second feed circuit transistors (Q3, Q4) are connected in series in said first branch;
   said third and fourth feed circuit transistors (Q5, Q6) are connected in series in said second branch;
   said first output terminal (1) of the feed circuit (17) is connected at a point of the first branch between the first and second feed circuit transistors (Q3, Q4); and
   said second output terminal (2) of the feed circuit (17) is connected at a point of the second branch between the third and fourth feed circuit transistors (Q5, Q6).

3. The solar tracker according to claim 2, wherein each of the first, second, third and fourth feed circuit transistors (Q3, Q4, Q5, Q6) of the feed circuit (17) has a drain terminal (D), a source terminal (S) and a gate terminal (G), and wherein:
- said drain terminals (D) of said first and third feed circuit transistors (Q3, Q5) of the first and second branches are connected to a first input terminal (3) of the feed circuit (17); and
- said source terminals (S) of said second and fourth feed circuit transistors (Q3, Q6) of the first and second branches are connected to a second input terminal (4) of the feed circuit (17).

4. The solar tracker according to claim 1, wherein in absence of said positive or negative limit signal from the inclinometer (16) the first and second actuator transistors (Q1, Q2) are in an on state.

5. The solar tracker according to claim 1, wherein said inclinometer (16) consists of an analogic accelerometer connected to a comparator circuit (18) that compares a voltage delivered by the analogic accelerometer with given levels of voltage corresponding to said positive and negative limit tilt angles (PLTA, NLTA) and issues said positive or negative limit signal to a corresponding one of the first and second actuator transistors (Q1, Q2).

6. The solar tracker according to claim 5, wherein said given levels of voltage are adjustable by first and second trimers (T1, T2).

7. The solar tracker according to claim 1, wherein said controller (14), said actuator (15), said feed circuit (17) and said inclinometer (16) are included in a circuit board (19) attached to the pivoting structure (12).

\* \* \* \* \*